United States Patent
Gaetani et al.

(10) Patent No.: US 7,378,814 B2
(45) Date of Patent: May 27, 2008

(54) METHOD FOR CONTROLLING A WOUND ROTOR SYNCHRONOUS MOTOR

(75) Inventors: Angelo Gaetani, Cotignola (IT); Claudio Rossi, Bologna (IT)

(73) Assignee: C.A.R.E.R. Carrellificio Elettrico Romagnolo Dell'Ing. Angelo Gaetani E C.S.N.C., Cotignola (RA) (IT)

( * ) Notice: Subject to any disclaimer, the term of this patent is extended or adjusted under 35 U.S.C. 154(b) by 0 days.

(21) Appl. No.: 11/661,374

(22) PCT Filed: Aug. 29, 2005

(86) PCT No.: PCT/IB2005/002552

§ 371 (c)(1),
(2), (4) Date: May 29, 2007

(87) PCT Pub. No.: WO2006/024920

PCT Pub. Date: Mar. 9, 2006

(65) Prior Publication Data

US 2008/0001570 A1 Jan. 3, 2008

(30) Foreign Application Priority Data

Aug. 31, 2004 (IT) .......................... MO2004A0218

(51) Int. Cl.
*H02P 1/46* (2006.01)
*H02P 6/00* (2006.01)

(52) U.S. Cl. .................. 318/717; 318/700; 318/714; 318/716; 318/254; 318/720

(58) Field of Classification Search .............. None
See application file for complete search history.

(56) References Cited

U.S. PATENT DOCUMENTS

| | | | | |
|---|---|---|---|---|
| 4,004,203 A | * | 1/1977 | Chalmers et al. | 318/713 |
| 4,110,669 A | * | 8/1978 | Akamatsu | 318/700 |
| 4,736,147 A | * | 4/1988 | Shizhang | 318/778 |
| 4,743,825 A | | 5/1988 | Nashiki et al. | |
| 5,296,794 A | * | 3/1994 | Lang et al. | 318/715 |
| 5,587,641 A | * | 12/1996 | Rozman | 318/801 |
| 5,770,909 A | * | 6/1998 | Rosen et al. | 310/113 |
| 7,072,778 B2 | * | 7/2006 | Swanson | 702/57 |
| 7,276,877 B2 | * | 10/2007 | Qiu et al. | 318/721 |
| 7,292,003 B1 | * | 11/2007 | Baker | 318/717 |
| 2005/0283324 A1 | * | 12/2005 | Swanson | 702/57 |

OTHER PUBLICATIONS

International Search Report for PCT/IB2005/002552 mailed Jan. 2, 2006.

(Continued)

*Primary Examiner*—Lincoln Donovan
*Assistant Examiner*—Eduardo Colon
(74) *Attorney, Agent, or Firm*—Nixon & Vanderhye P.C.

(57) ABSTRACT

A method for the control of a wound rotor synchronous motor comprises measuring a plurality of electromagnetic entities indicative of the operation of the motor, generating voltage on a stator of the motor to obtain a stator current, further generating a further voltage on the rotor to obtain a rotor current, before the generating and the further generating, the entities being processed to calculate references for the stator current and for the rotor current, the references corresponding to the generation by the motor of the maximum torque obtainable per ampere of stator current supplied.

18 Claims, 13 Drawing Sheets

OTHER PUBLICATIONS

Guang et al., "Novel approach for operation analysis of vector controlled adjustable speed synchronous machine drives", Power Electronics and Motion Control Conference, IEEE, vol. 2, No. 15, pp. 792-797 (2000).

Zordan et al., "Field-weakening in vector controlled and DTC PMSM drives, a comparative analysis", Power Electronics and Motion Control Conference, IEEE, pp. 493-499 (2000).

Chalmers et al., "Variable-frequency synchronous motor drives for electric vehicles" Industry Applications Conference, IEEE, vol. 1, pp. 717-724 (1995).

Kaddouri et al., "Nonlinear feedback control of a permanent magnet synchronous motors", Electrical and Computer Engineering, 1999 Conference, IEEE, pp. 77-80 (1994).

* cited by examiner

METHOD FOR CONTROLLING A WOUND ROTOR SYNCHRONOUS MOTOR

BACKGROUND AND SUMMARY OF THE INVENTION

This application is a National Stage of PCT International Application No. PCT/IB2005/002552 filed Aug. 29, 2005 which claims priority to IT Application No. MO2004A000218 filed Aug. 31, 2004. The entire contents of these applications are incorporated herein by reference.

The invention relates to a method for the control of a wound rotor synchronous motor, particularly but not exclusively suitable for traction of an electric vehicle, for example a forklift truck, and for use in automatic machines, machine tools, lifting machines, industrial robots, and for ship propulsion.

Electric vehicles are known that use drives based on direct-current motors or induction motors or permanent magnet synchronous motors, having different configurations (internal magnets, hybrid motors, etc) coupled with suitable power converters. In these types of drive, the capability of reaching high torque at low speed can be obtained only by injecting a high current into the motor stator windings. Maximum torque is mainly limited by the maximum current obtainable from the electronic converter.

This limitation is due to the high cost per ampere of the electronic power converter and its limited overload capability in terms of peak current and overload time. Oversizing of the power electronic converter is the method that is usually employed to inject high current into the motor and to reach the desired performance at low speed.

This solution often leads to very high costs that can discourage the implementation of drives for heavy electric vehicles powered by a group of standard lead-acid batteries at low voltage (<100V).

The possibility of obtaining constant power operation over a wide speed range has been studied for different configurations of internal permanent magnet synchronous motors (indicated by the acronym IPM-SM standing for "Internal Permanent Magnet Synchronous Motor" in English). In these types of motor, the machine parameters that allow constant power operation up to a high speed do not match the machine parameters required to reach high torque at low speed.

Some solutions have been presented for extending the constant power region without compromising the capability of obtaining high torque at low speed.

The aforementioned solutions include hybrid machines composed of a two-part rotor and comprising a surface magnet part and a reluctance part, field windings positioned in the stator that change the level of excitation produced by the permanent surface magnets, movable parts on both sides of the rotor that short-circuit the flux path, reducing the flux-linkage with the stator produced by the permanent magnets.

In industrial applications requiring constant power operation over a wide speed range an alternative solution to internal permanent magnet synchronous motors (IPM-SM) is represented by wound rotor synchronous motors (indicated as "WR-SM", the English acronym for "wound rotor synchronous motor").

In particular, synchronous motors are used for large drives, such as for example ship propulsion and in rolling mill drives. These motors are used because of their high efficiency, high overload capability and good performance in the field-weakening region.

FIG. 1 shows a comparison between the expected performance of a WR-SM and of an IPM-SM in terms of torque and power in function of speed. For the comparison, it is assumed that both motors have the same rated power and the same rated current.

As shown in FIG. 1, a drive based on a WR-SM is suitable for meeting the requirement for high starting torque at low speed that is typical of electric vehicles and for operation at constant power over a wide speed range.

The use of traction systems based on WR-SM in electrical vehicles is proposed in WO9013454.

However, this patent document does not propose a control method at the instantaneous values of a WR-SM.

An object of the present invention is to obtain a method for the control of a wound rotor synchronous motor.

A further object is to obtain a method that enables the operation of a wound rotor synchronous motor to be controlled instant by instant, which wound rotor synchronous motor is arranged to drive an electric vehicle in such a way as to obtain high starting torque and at low operating speed, and constant power operation at high speed.

According to the invention, there is provided a method for controlling a wound rotor synchronous motor, comprising measuring a plurality of electromagnetic entities indicative of the operation of said motor, generating voltage on a stator of said motor to obtain stator currents, further generating further voltage on said rotor to obtain a rotor current, wherein said method further comprises, before said generating and said further generating, processing said entities to calculate references for said stator currents and for said rotor current, said references corresponding to the generation by said motor of the maximum torque obtainable per ampere of stator current supplied.

Owing to the invention, it is possible to obtain a method for controlling a wound rotor synchronous motor that is able to obtain the maximum torque per ampere of stator current in the entire operating field of the motor.

This method is based on the study of instantaneous machine values in linear conditions. The application of the linear model to the real machine operating in the saturation conditions of the magnetic circuit, and therefore in non-linear conditions, is possible by means of a linearization procedure carried out for each operating point. The method uses a flux estimator for estimating machine stator flux. Estimated flux is used to calculate parameters to be inserted into the linear model. By means of the equations of the linear model the optimal supply conditions are identified for each machine operating point, the optimal supply condition complying with operating conditions existing at that point.

Owing to the invention, it is possible to make an electric drive based on the use of a wound rotor synchronous motor that is particularly suitable for the traction of electric vehicles.

Drives based on WR-SM controlled by the method according to the invention are able to generate high torque at low speed by overloading the excitation winding and keeping the stator current at acceptable values, thus avoiding excessive oversizing of the electronic power converter, which supplies the stator.

Furthermore, the possibility of regulating the excitation current enables the machine to operate at constant power up to a theoretically unlimited speed.

These torque-delivering features of the WR-SM machine furthermore meet the electric traction requirements.

The drives disclosed above require an excitation winding on the rotor, brush slip rings for supplying the excitation winding and a direct-current/direct-current chopper for regulating the excitation current. These components are based on consolidated technologies and do not cause a significant increase in the cost of the drives.

BRIEF DESCRIPTION OF THE DRAWINGS

The invention may be better understood and implemented with reference to the attached drawings that illustrate some embodiments thereof by way of non-limitative example in which.

DETAILED DESCRIPTION OF THE INVENTION

Figure 1:
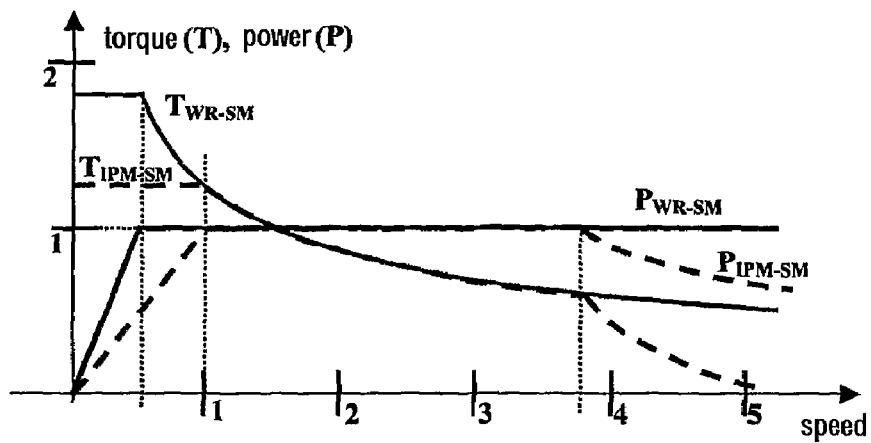
FIG. 1 is a graph showing the comparison between the features of a WR-SM and of an IPM-SM.

The main symbols which will be used in the detailed disclosure are listed below.

Nomenclature (at instant values):

- $V_r$ [V] module of maximum phase voltage that the inverter can apply to the stator;
- p number of polar pairs of the machine;
- $M_{se}$ [H] maximum value of mutual induction between stator winding and rotor winding;
- $i_e$ [A] excitation current;
- $I_{REF}$ [A] reference of the module of the stator current;
- $\Theta$ [rad] electrical position of the reference system dq that is synchronous with the rotor;
- $\omega$ [rad/s] electric speed of the rotor;
- $i_a$, $i_b$, $i_c$ [A] currents of the stator phases;
- $i_d$, $i_q$ [A] components of the stator current in the rotating two-phase reference system dq;
- $i_d^s$, $i_q^s$ [A] components of the stator current in the fixed two-phase reference system $dq^s$;
- $i_{dREF}$, $i_{qREF}$ [A] references of the components of the stator current in the reference system dq;
- $\Phi_d$, $\Phi_q$ [Wb/m²] components of the gap flux in the reference system dq;
- $i_{eREF}$ [A] reference of the excitation current;
- $L_d$, $L_q$ [H] "equivalent inductance" parameters in the reference system dq;
- $r_s$ [Ω] stator phase resistance;
- $v_d^s$, $v_q^s$ [V] components of the reference stator voltage in the fixed reference system $dq^s$.

A first part of the disclosure is dedicated to the theoretical analysis of a linear wound rotor asynchronous motor.

In this part of the description the analysis of a linear WR-SM is carried out using the synchronous rotating d-q reference system.

Considering the d axis aligned with the rotor pole, and ignoring the stator resistance, the stator voltage equations of the WR-SM machine are $$\begin{cases} v_d = \dfrac{d\Phi_d}{dt} - \omega \Phi_q \\ v_q = \dfrac{d\Phi_q}{dt} + \omega \Phi_d \end{cases} \quad (1)$$

where the flux-linkages relative to d- and q-axis are $$\Phi_d = L_d i_d + M_{se} i_e \quad (2)$$

$$\Phi_q = L_q i_q \quad (3)$$

The expression of the torque generated by the WR-SM is $$T = \tfrac{3}{2} p [M_{se} i_e i_q + (L_d - L_q) i_q i_d] \quad (4)$$

in which the first term represents the torque due to the excitation flux, whereas the second term is the torque contribution due to the motor anisotropy.

As mentioned above, the study of the machine is developed on the $i_d$-$i_q$ plane. On this plane the limits set by the current supply and the voltage supply can be represented as follows.

The limit on the capacity to provide current from an inverter associated with the motor is represented by $$i_d^2 + i_q^2 = I_r^2, \quad (5)$$

where $I_r$ is the module of the rated stator phase current supplied by the inverter.

The limit set by the maximum available voltage can be represented by $$i_q^2 + \left(\dfrac{L_d}{L_q}\right)^2 \left(i_d + \dfrac{M_{se} i_e}{L_d}\right)^2 = \left(\dfrac{V_r}{\omega L_q}\right)^2 \quad (6)$$

where $V_r$ is the magnitude of the maximum voltage that the inverter can apply to the motor.

The current limit (5) defines a circle centred on the $i_d$-$i_q$ plane origin. The voltage limit (6) defines an ellipse, centred on the following coordinates $$i_{d0} = -\dfrac{M_{se} i_e}{L_d}; \quad i_{q0} = 0 \quad (7)$$

with semi-axes in the $i_d$ and $i_q$ directions equal to, respectively, $$s_d = \dfrac{V_r}{\omega L_d}; \quad s_q = \dfrac{V_r}{\omega L_q} \quad (8)$$

Figure 2:
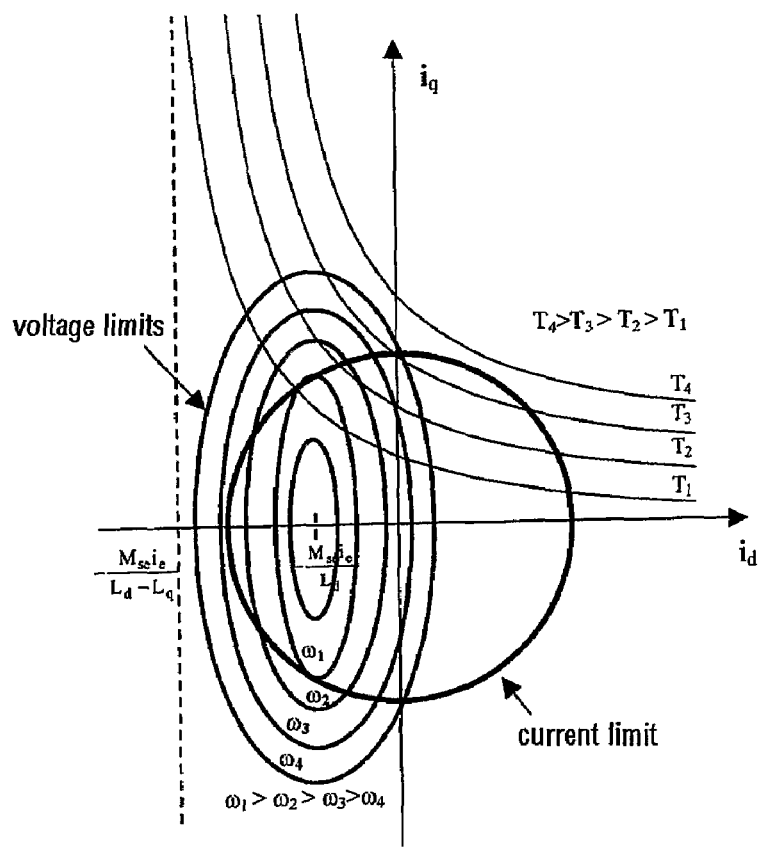
FIG. 2 is a diagram showing the operating limits of the WR-SM on the plane $i_d$-$i_q$ with $M_{se}i_e < L_d I_r$.

As in this machine $L_d > L_q$, the ellipse is oriented as shown in FIG. 2.

It can be noted in (7) that the position of the ellipse centre depends on the excitation current. The centre moves in the direction of the negative $i_d$ or towards the origin as the excitation current is increased or decreased, respectively.

For a given value of the excitation current, by increasing the rotating speed the voltage ellipse becomes smaller and smaller until it collapses in its origin.

On the $i_d$-$i_q$ plane, the torque expression (4) is represented by a hyperbola, having the following asymptotes $$i_q = 0; \ i_d = -\frac{M_{se} i_e}{L_d - L_q} \qquad (9)$$

As $L_d > L_q$, the vertical asymptote is located on the semi-plane $i_d < 0$, and its position depends on the excitation current.

A given torque value can be obtained for any combination of stator currents ($i_d$, $i_q$) that lies inside the limits defined by the current circle and the voltage ellipse.

The position of the centre of the voltage ellipse defines the maximum rotating speed. If the centre lies inside the current circle, the rotating speed is theoretically unlimited ($\omega_{MAX} = \infty$). If the centre is positioned outside the current circle, the maximum theoretical speed corresponds to the intersection of the current circle with the smaller voltage ellipse and is given by $$\omega_{MAX} = \frac{V_r}{M_{se} i_e - L_d I_r} \qquad (10)$$

with $i_d = -I_r$, $i_q = 0$.

The control of the excitation current makes it possible to move the centre of the ellipses and the torque asymptote in order to obtain the best performance of the machine over a wide speed range.

Best performance of the machines can be defined in several ways, such as:

operation at maximum efficiency;

operation at maximum torque per ampere;

operation at maximum power factor.

A control technique is illustrated below that gives maximum torque per ampere of the stator current for any rotation speed.

At low speeds, maximum torque per ampere is always obtained with an excitation current equal to its maximum value ($i_e = i_{eM}$).

Figure 3A:
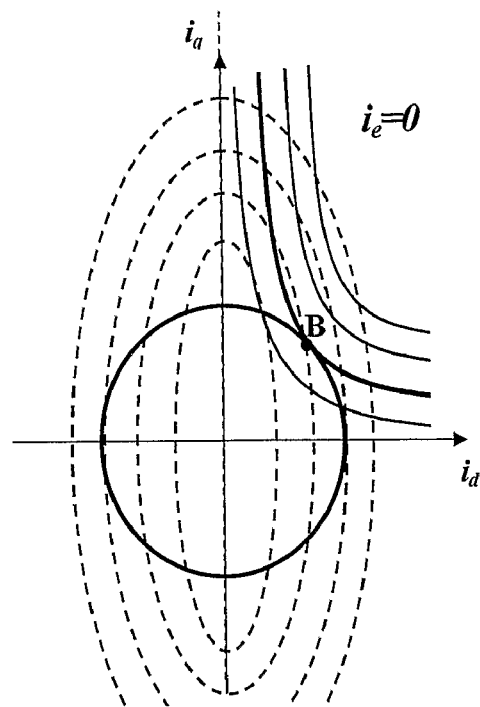
FIGS. 3a, 3b and 3c are graphs showing the torque hyperbolas, voltage limit and current limit curves obtained for different values of excitation current $i_e$.
Figure 3B:
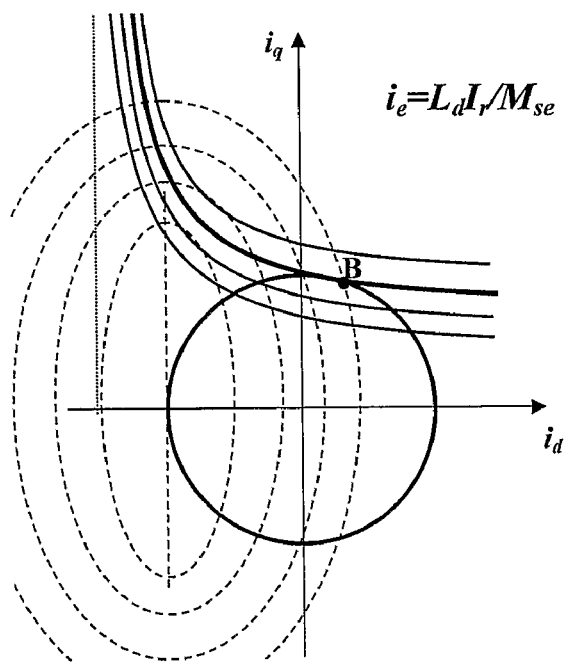
Figure 3C:
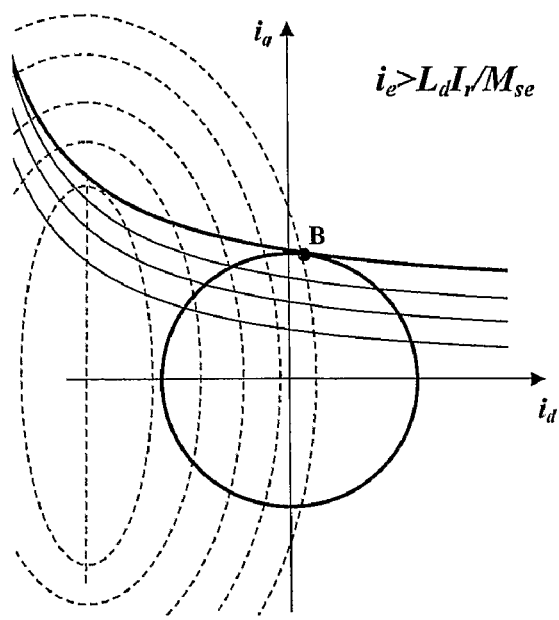

FIGS. 3a, 3b and 3c show torque hyperbolas obtained for different values of the excitation current. The higher the excitation current, the higher the torque that can be generated with the same stator current. In these terms, FIG. 3c represents the best operating conditions for the machine at low speed.

At high speed, the operation of the machine at maximum torque per ampere can be obtained by regulating the excitation current so as to achieve unity power factor operating conditions.

The combination of $i_d$, $i_q$ and $i_e$ that generates the highest torque for any given speed value can be found by using a standardised p.u. representation of the machine. The current components in the p.u. representation are $\tilde{i}_d = i_d/I_r$ and $\tilde{i}_q = i_q/I_r$.

Below, the analysis will be carried out assuming the magnitude of the stator current to be equal to the rated current of the inverter [4]. Consequently, the p.u. current components become $$\tilde{i}_d = \cos \Theta \qquad (11)$$

$$\tilde{i}_q = \sin \Theta \qquad (12)$$

where $\Theta$ is the phase angle of the vector representing the stator current.

For the analytical developments, the following quantities are defined $$r = \frac{L_d}{L_q},$$

saliency ratio $\qquad (13)$ $$a = \frac{M_{se} i_e}{L_d I_r},$$

$\tilde{i}_d$ coordinate of the centre of the ellipse $\qquad (14)$

With a=1 the centre of the ellipses corresponds to the intersection of the circle representing the current limit with the axis $\tilde{i}_d$, whereas with a<1 and a>1 the centre of the ellipses is respectively inside and outside the circle representing the current limit circle.

The torque expression (4) can be rewritten as $$T = \frac{3}{2} p L_d I_r^2 \left( \frac{M_{se} i_e}{L_d I_r} \frac{i_q}{I_r} + \frac{(L_d - L_q)}{L_d} \frac{i_q}{I_r} \frac{i_d}{I_r} \right) \qquad (15)$$

Substituting (11)-(14) in (15) yields $$T = \frac{3}{2} p L_d I_r^2 \left( a\sin\theta + \left(1 - \frac{1}{r}\right) \sin\theta \cos\theta \right). \qquad (16)$$

From (16) the torque can be expressed as $$T = T_0 t \qquad (17)$$

where $$T_0 = \tfrac{3}{2} p L_d I_r^2 \qquad (18)$$

and $$t = a\sin\vartheta + \left(1 - \frac{1}{r}\right) \sin\vartheta \cos\vartheta, \qquad (19)$$

is the normalized torque.

By introducing (11)-(14) and (19) in (6), the equation of the ellipses representing the voltage limit in the p.u. representation becomes $$\sin^2\Theta + r^2(\cos\Theta + a)^2 = b^2 \qquad (20)$$

where $$b = \frac{s_q}{I_r} = \frac{V_r}{\omega L_q I_r}. \quad (21)$$

Below, three different operation regions of the wound rotor synchronous motor are examined: a low-speed operation region, a high-speed operation region and a transition-speed region interposed between the low-speed operation region and the high-speed operation region.

A. Low-Speed Region

For the maximum value of the excitation current ($i_e = i_{eM}$), the ellipses representing the voltage limit are centred on $\tilde{i}_d = -a_M$, where $$a_M = \frac{M_{se} i_{eM}}{L_d I_r}. \quad (22)$$

With this excitation current, the current vector angle $\Theta_B$ that gives the maximum torque is obtained by setting:

$$\frac{dt}{d\vartheta} = 0,$$

which leads to $$\cos\vartheta_B = \frac{-a + \sqrt{a^2 + r'^2}}{4r'}, \quad (23)$$

where $$r' = 1 - \frac{1}{r} \quad (24)$$

Solving (23) for $\Theta_B$ and substituting in (19) gives the maximum torque $t_B$.

Substituting (23) in (20) yields $$b_B = \sqrt{(1-\cos^2\Theta_B) + r^2(\cos\Theta_B + a)^2}. \quad (25)$$

Equating (25) to (21) gives the highest speed $\omega_B$ at which maximum torque $t_B$ can be obtained.

Figure 5:
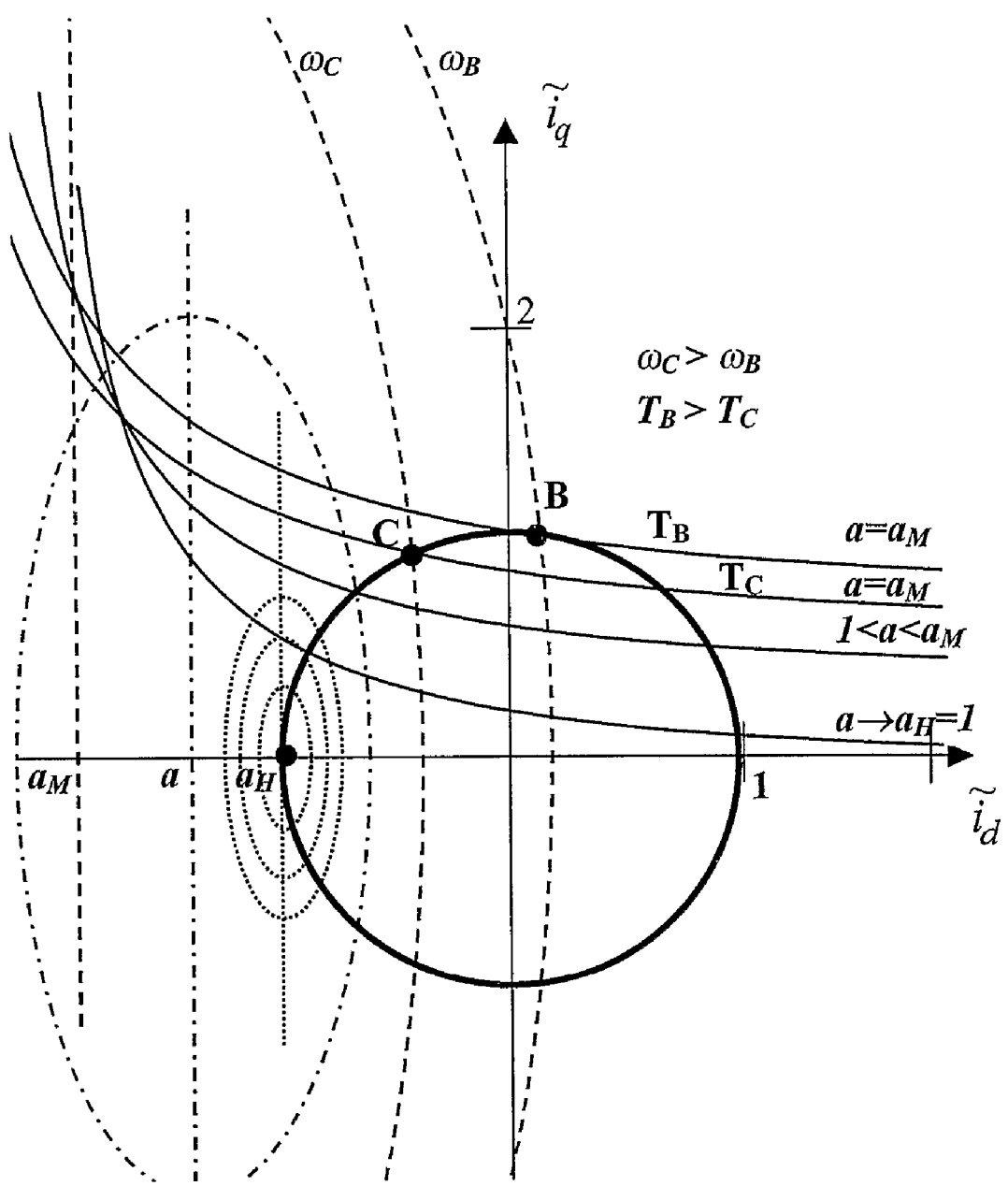
FIG. 5 is a graph of the operating conditions of a machine with r=3, on the normalized plane $\tilde{i}_d, \tilde{i}_q$.

Point B, shown in the p.u. graph of FIG. 5, represents the base operating point of the machine.

B. High-Speed Region

When angular speed exceeds $\omega_B$ no further maximum torque $t_B$ can be obtained because of the limit set by the available voltage. However, for any angular speed $\omega > \omega_B$ it is possible to find a combination of armature current components and excitation current, defined by suitable $\Theta$ and a values, which enables the maximum torque to be generated. It has been ascertained that, taking into account the voltage limit, this operating condition is achieved at unity power factor.

Figure 4:
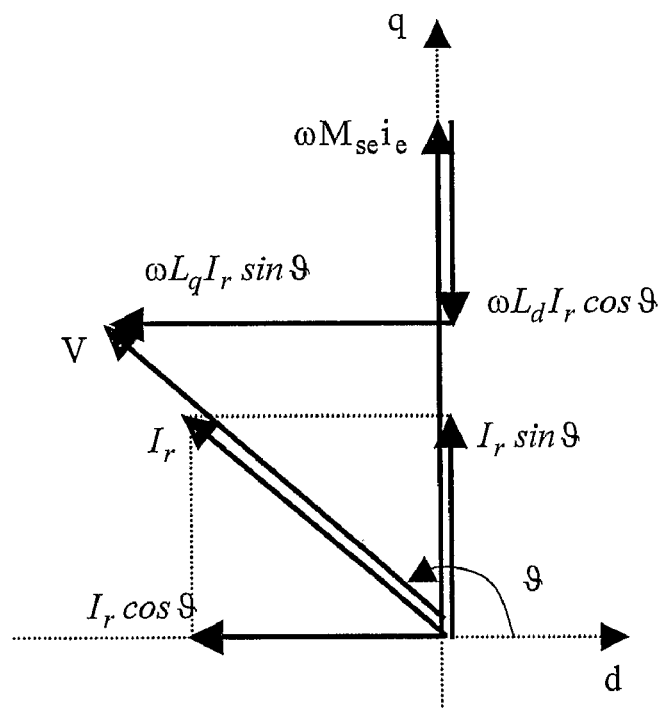
FIG. 4 is a vector graph of unity power factor operation of the WR-SM.

With reference to the vector graph in steady-state conditions, shown in FIG. 4, the unity power factor operating condition can be represented by the following equations $$\begin{cases} V_r \cos\vartheta = \omega L_q i_q \\ V_r \sin\vartheta = \omega L_d i_d + \omega M_{se} i_e \end{cases} \quad (26)$$

By inserting the current limit $i_d = I_r \cos\Theta$ and $i_q = I_r \sin\Theta$ in (26) leads to $$\begin{cases} V_r \cos\vartheta = \omega L_q I_r \sin\vartheta \\ V_r \sin\vartheta = \omega L_d I_r \cos\vartheta + \omega M_{se} i_e \end{cases} \quad (27)$$

By solving (27) for $\Theta$ it is possible to determine the phase angle $\Theta_H$ of the armature current vector that ensures a unity power factor at any angular speed $\omega > \omega_B$. The solution is $$\vartheta_H = \pi - \tan^{-1}\left(\frac{V_r}{\omega L_q I_r}\right) = \pi - \tan^{-1}(b). \quad (28)$$

From (27) the corresponding excitation current is $$i_{eH} = \frac{V_r \sin\vartheta_H - \omega L_d I_r \cos\vartheta_H}{\omega M_{se}} \quad (29)$$

Substituting (29) in (14) leads to $$a_H = \frac{b}{r}\sin\vartheta_H - \cos\vartheta_H. \quad (30)$$

Torque can be calculated by introducing (28) and (30) in (19). It is possible to check that the resulting torque corresponds to constant power operation. Furthermore, the parameter $a_H$ assumes the asymptotic value $a_H = 1$ for $\omega \to \infty$, which means that the centre of the voltage ellipses is placed on the current circle (i.e. $a_H = 1 \to M_{se} i_{eH} = L_d I_r$).

C. Transition Speed Region

Machine operation with unity power factor is prevented at low speed by the maximum value of the excitation current. As can be seen from (29), the lower the speed, the greater the excitation current.

In general, the maximum excitation current is reached at a speed $\omega_C$ greater than $\omega_B$.

Therefore the speed range between $\omega_B$ and $\omega_C$, in which unity power factor operation cannot be achieved, must be further examined for completing the disclosure of the control technique.

In this speed range, considered as a transition region between constant torque and constant power operation, the best performance is obtained at the points of the current limit circle defined by the intersection with the voltage ellipses. The current vector angle can be calculated from (20) to obtain $$\cos\vartheta_{BC} = \frac{-r^2 a_M + \sqrt{-r^2 + r^2 b^2 + 1 - b^2 + r^2 a_M^2}}{r^2 - 1} \quad (31)$$

By way of example, FIG. 5 represents the operating condition in the p.u. coordinates for a machine with r=3, $a_M=1.8$. Point B is obtained with $b_B=6.42$, whereas unity power factor operation is obtained for values of b less than $b_C=4.95$. At very high speeds the excitation current is reduced to a value corresponding to $a_H=1$.

Example of Machine Operation

In order to show the behavior of the most representative machine entities, a numeric simulation from zero to maximum machine speed has been carried out.

The machine parameters are given in the table below.

| WR-SM parameters | |
|---|---|
| $L_d$ | 90 mH |
| $L_q$ | 30 mH |
| $M_{se}$ | 420 mH |
| $I_r$ | 18 A |
| $V_r$ | 310 V |
| $i_{eM}$ | 7 A |
| p | 2 |

Figure 6:
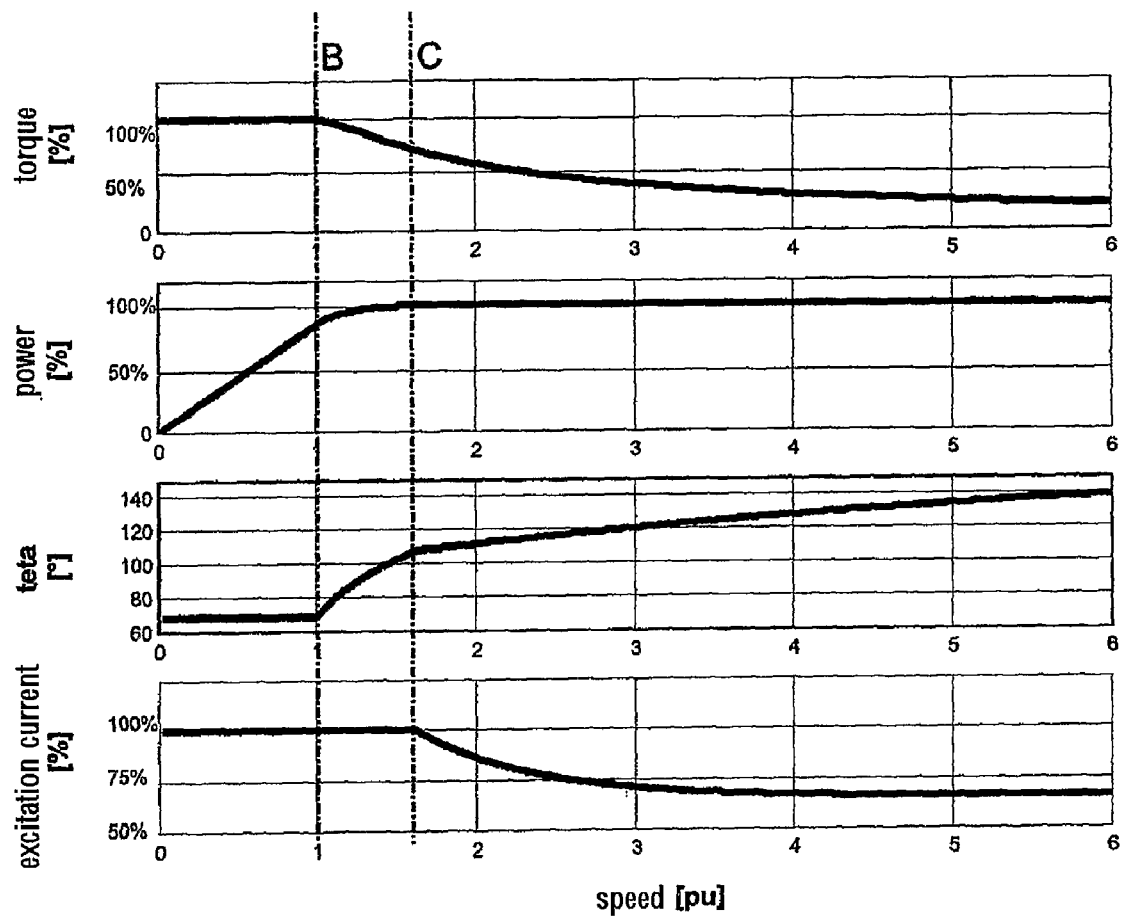
FIG. 6 is a graph showing the torque, the power, the stator current angle and the excitation current as a function of the speed of rotation of the machine.

FIG. 6 shows, from top to bottom, the torque, the power, stator current angle and the excitation current as a function of speed.

Figure 7:
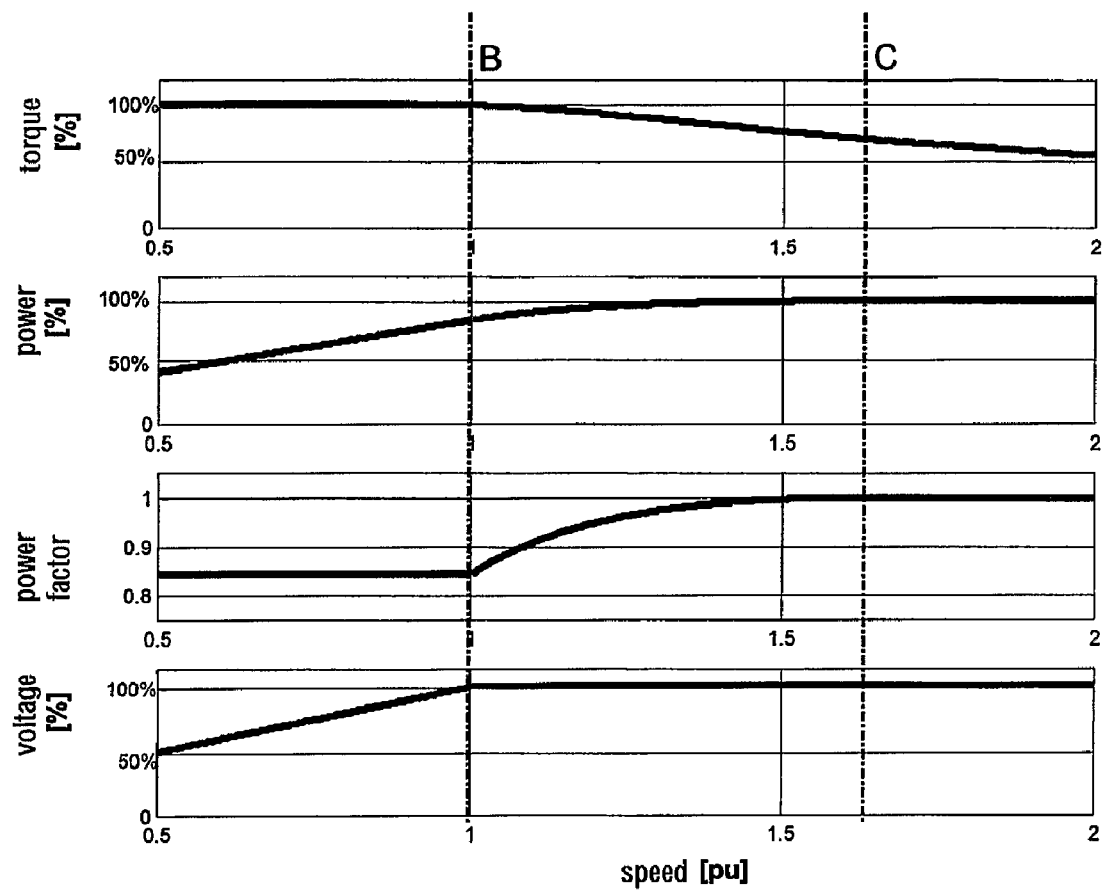
FIG. 7 is a graph showing the torque, the power, the power factor and the supply voltage of the stator according to the rotation speed of the machine in the transition region.

FIG. 7 shows the torque, the power, the power factor and the supply voltage in the transition speed range between a constant-torque operation region and a constant-power operation region.

In FIG. 6 it can be seen that the excitation current is kept at its maximum value until point C corresponding to the end of the transition region, and subsequently decreases at higher speeds.

In FIG. 7 it can be seen that in the transition range the power factor increases from 0.85 to 1. Torque is constant for speeds lower than the speeds corresponding to point B whilst power is constant for speeds greater than the speed corresponding to point C. The operation of WR-SM at constant speed theoretically extends to an unlimited speed.

Description of the Control Method

Figure 8:
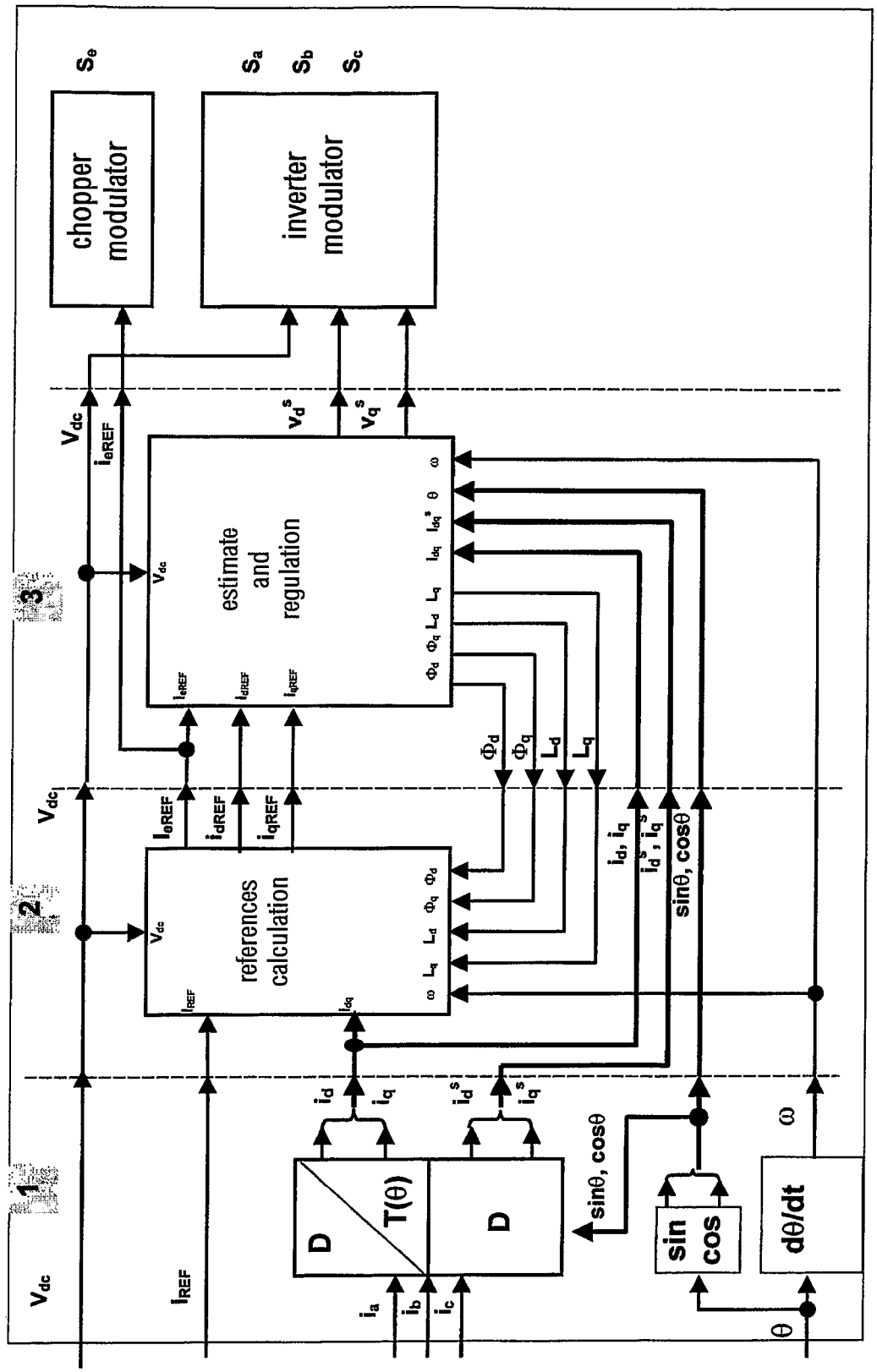
FIG. 8 is a block diagram that shows the control phases of a wound rotor synchronous motor.

FIG. 8 shows a flow-chart illustrating the phases of the method according to the invention.

This flow-chart comprises a first section (SECTION 1 hereinafter) regarding the acquisition of the electromagnetic entities, the transformations of reference system and the measuring of instantaneous speed, a second section (hereinafter SECTION 2) regarding the generation of reference values of the electromagnetic entities and a third section (hereinafter SECTION 3) regarding the estimate of the magnetic flux and the current regulation.

The above three sections will be examined in detail below.

Section 1—Acquisition and Transformations of Reference System

Figure 9:
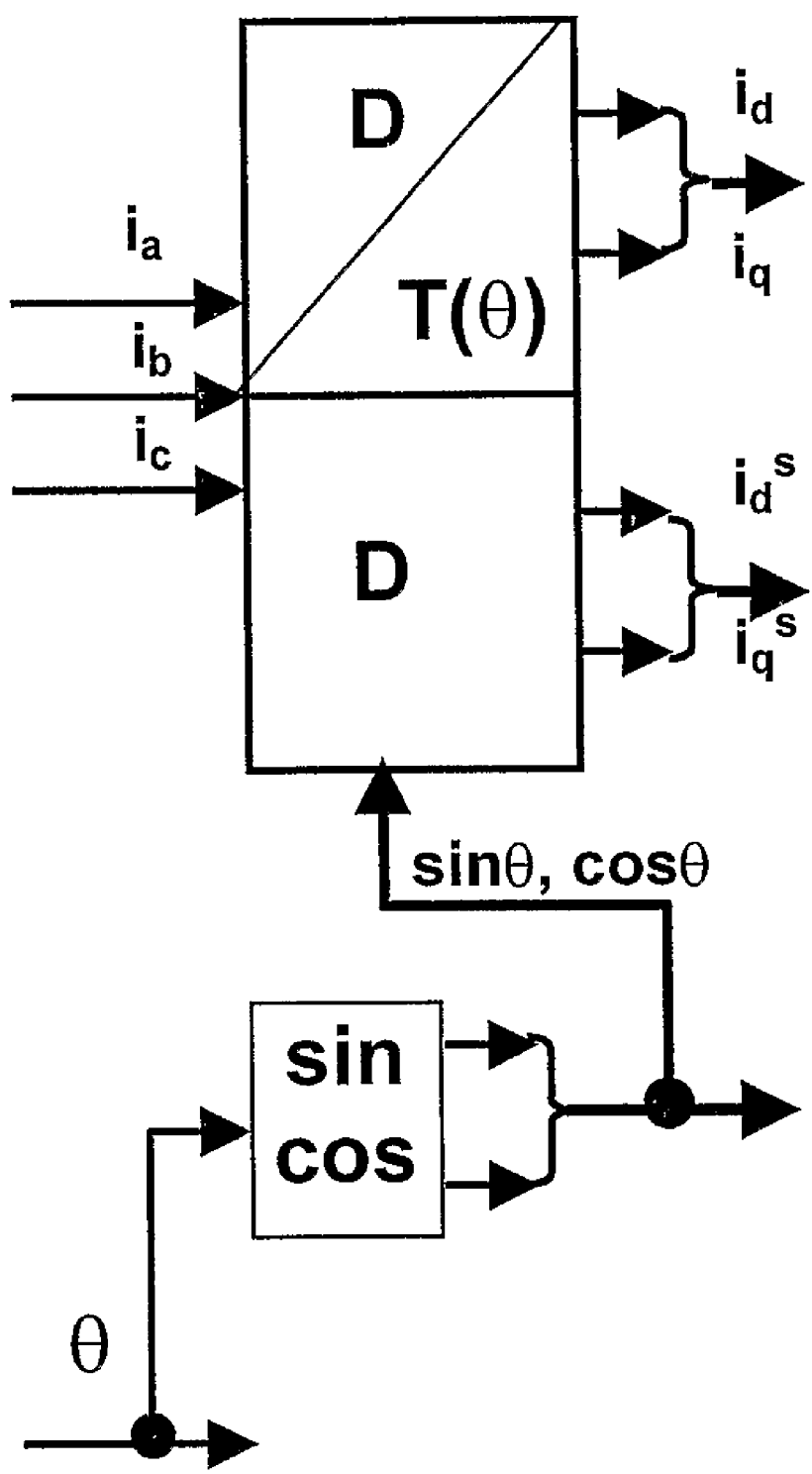
FIG. 9 is a diagram that illustrates the transformation of the reference system of the electromagnetic entities of the wound rotor synchronous motor.
Figure 10:
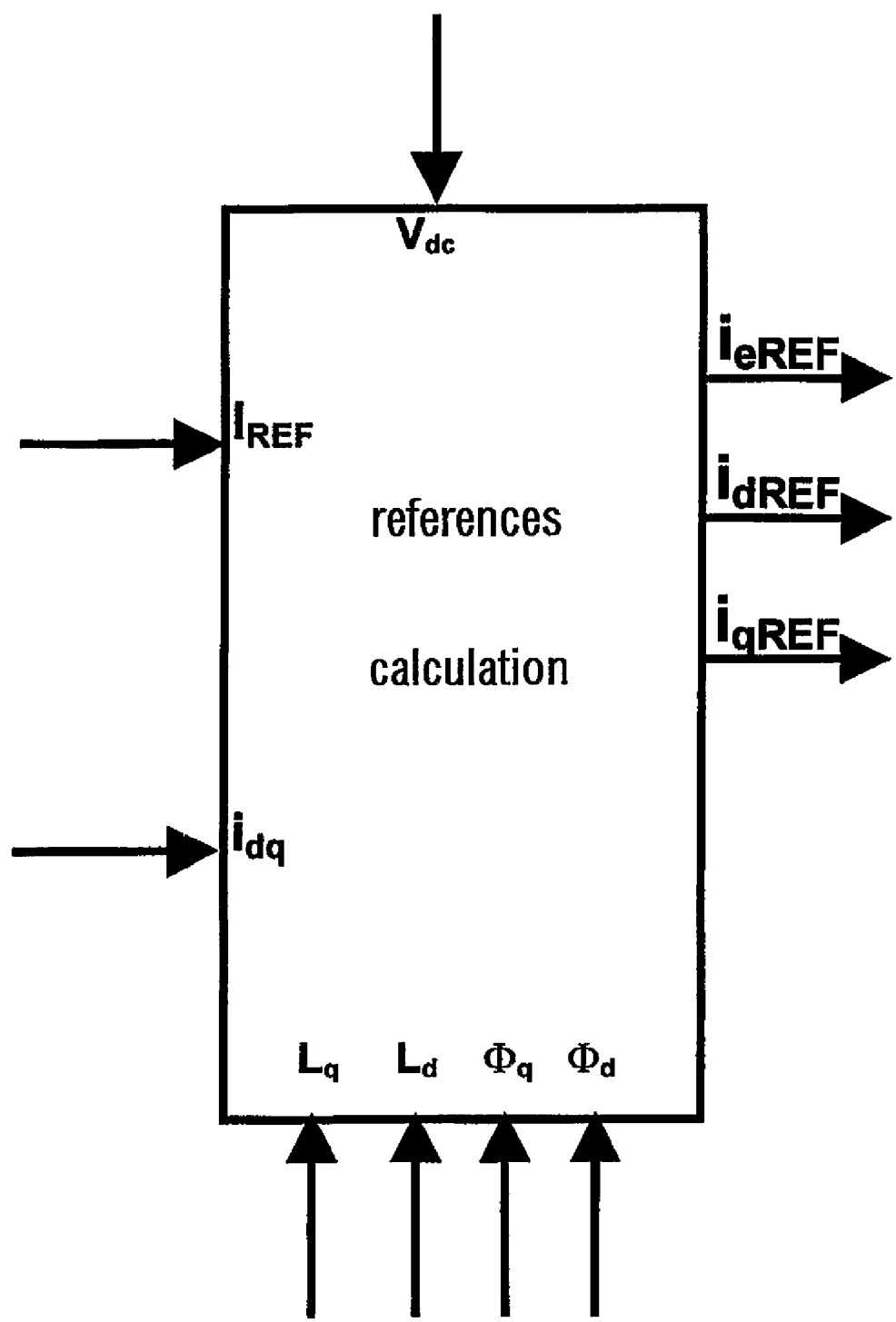
FIG. 10 is a diagram that illustrates the calculation of references used by the above method.

With reference to the diagram shown in FIG. 9, the acquired stator currents are transformed by the matrices D and T shown below in the fixed two-phase reference system $dq^s$ and the two-phase rotating system dq that is synchronous with the rotor.

$$\begin{bmatrix} i_d^s \\ i_q^s \end{bmatrix} = [D] \begin{bmatrix} i_a \\ i_b \end{bmatrix}; \quad [D] = \begin{bmatrix} 1 & 0 \\ 1/\sqrt{3} & 2/\sqrt{3} \end{bmatrix}$$

-continued $$\begin{bmatrix} i_d \\ i_q \end{bmatrix} = [T] \begin{bmatrix} i_d^s \\ i_q^s \end{bmatrix}; \quad [T] = \begin{bmatrix} \cos\vartheta & -\sin\vartheta \\ \sin\vartheta & \cos\vartheta \end{bmatrix}$$

$$\begin{bmatrix} i_d^s \\ i_q^s \end{bmatrix} = [T]^{-1} \begin{bmatrix} i_d \\ i_q \end{bmatrix}; [T]^{-1} = \begin{bmatrix} \cos\vartheta & \sin\vartheta \\ -\sin\vartheta & \cos\vartheta \end{bmatrix}$$

$$\begin{bmatrix} i_a \\ i_b \end{bmatrix} = [D]^{-1} \begin{bmatrix} i_d^s \\ i_q^s \end{bmatrix}; [D]^{-1} = \begin{bmatrix} 1 & 0 \\ -1/2 & \sqrt{3}/2 \end{bmatrix}^{-1}$$

The position of the rotating reference system dq is identified by the rotor position by means of ankle $\Theta$.

The position of the rotor in electric degrees is measured by a suitable measuring transducer (encoder).

Speed is calculated as a temporal derivative of the position, according to the formula set out below.

$$\Theta \rightarrow \boxed{d\Theta/dt} \rightarrow \omega$$

As the system is discrete, the calculation is carried out at the finite differences.

At the k-th interval the following speed is calculated:

$$\omega_k = \frac{\Delta\vartheta_k}{\Delta T};$$

where:

$\omega_k$ average speed in calculation interval $\Delta T$
$\Delta T$ calculation interval, equal to a whole multiple of the calculation period $T_c$, so $\Delta T = NT_c$
$\Delta\Theta_k$ rotation that occurred in the interval $\Delta T$ so:

$$\omega_k = \frac{\vartheta_k - \vartheta_{k-N}}{NT_c}.$$

Section 2—Generation of References

This block contains the machine control strategy.

Figure 11:
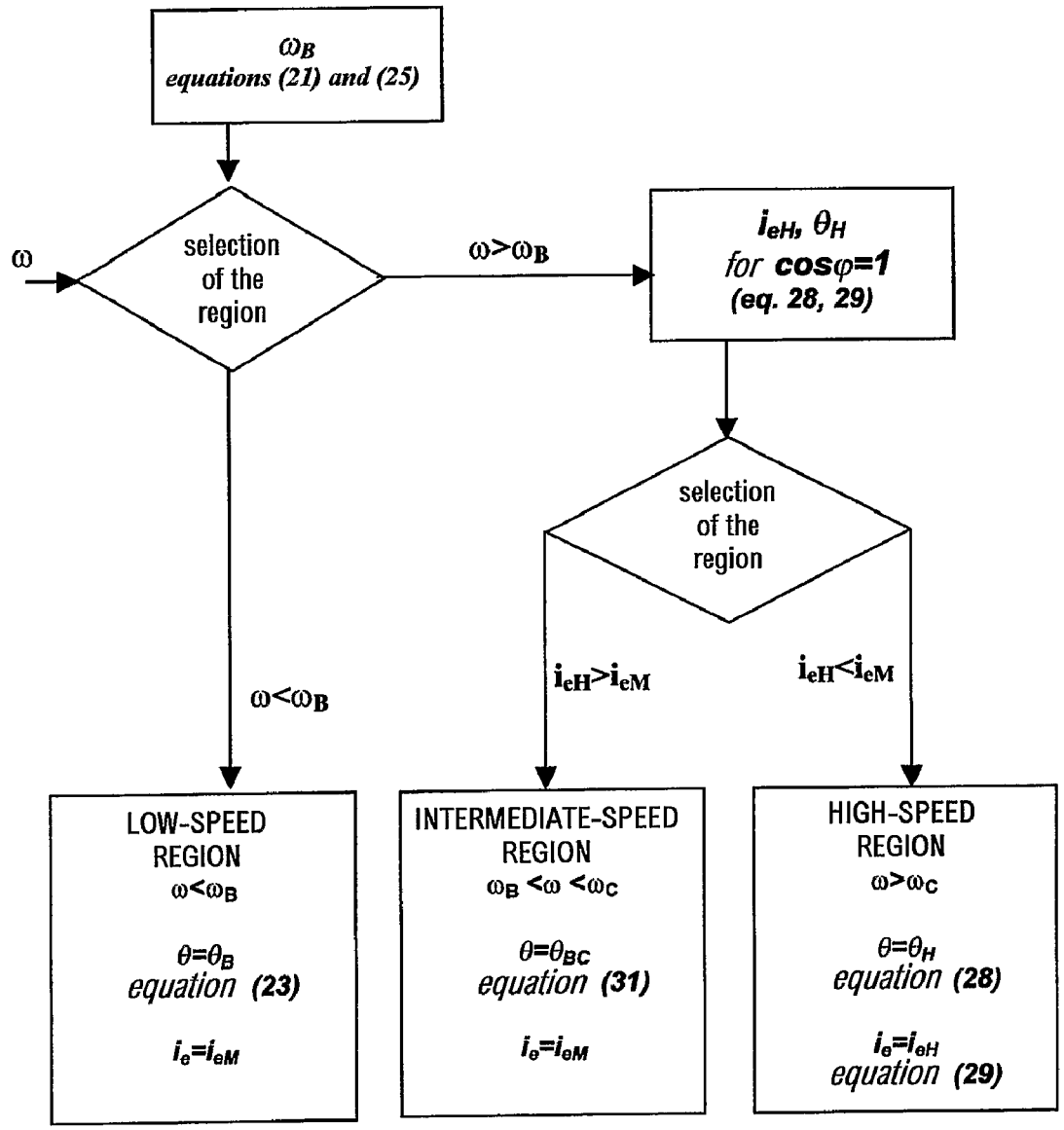
FIG. 11 is a block diagram that shows the selection of the operation regions of the wound rotor synchronous motor.

With reference to FIG. 11, in function of rotation speed $\omega$ and maximum voltage $V_r$ that the inverter is able to apply to the motor, there is calculated the combination of machine currents $i_{dqREF}$, $i_{eEF}$ for which the machine absorbs a module stator current equal to the required reference $I_{REF}$ and produces the maximum generatable torque.

The references of the stator currents $i_{dqREF}$ and the rotor currents $i_{eREF}$ are generated that will be used by the current regulators for the generation of the machine currents and for the estimate of the machine parameters in SECTION 3.

To calculate the references, the estimated machine parameters $L_d$, $L_q$ and the estimated fluxes $\Phi_{dq}$ calculated in SECTION 3 are used.

The control strategy is based on the knowledge of the linear model of the synchronous machine as defined by the equations (1)-(31) reported above.

The real machine operates in conditions of saturation of the magnetic circuit and therefore in a non-linear condition. The model of the machine operating in conditions of saturation is obtained by using the linear model in which the values of the parameters are updated instantaneously using the virtual values calculated by the ESTIMATOR block that is in SECTION 3. The estimated values of the parameters depend on the machine's actual operating conditions.

The machine operating in saturation conditions is thus represented by a linear model with estimated variable parameters.

Instantaneously, by using the model of the machine in saturation conditions, depending on the available voltage $V_{dc}$ and the rotation speed $\omega$, the machine's operation field is divided into the three operation zones examined previously, i.e.:
1) low-speed operation zone
2) intermediate-speed operation zone
3) high-speed operation zone.

In the low-speed operation zone the value of the excitation current corresponds to the maximum permissable value $i_e = i_{eM}$. There is a sole operation point at maximum torque, which is point B, shown in FIG. 5.

Operation in this zone is possible up to speed $\omega_B$.

In the intermediate speed operation zone the value of the excitation current is equal to the maximum permitted value $i_e = i_{eM}$.

For each speed there is a locus $i_{dq}$—in which torque is at maximum—described by the circle arc comprised between points B and C, shown in FIG. 5.

Operation in this zone is possible up to speed $\omega_B < \omega < \omega_C$.

In the high-speed operation zone the values of the excitation current $i_e$ and of the stator current components $i_{dq}$ are regulated in such a way as to obtain maximum torque per stator current.

Regulation corresponds to the machine's unity power factor operation.

Operation in this zone is possible for speeds greater than $\omega_C$. The operation in this zone has no upper speed limit.

Management of the control strategy of the three zones occurs according to the block diagram in FIG. 11.

Two selection blocks are present, in which, depending on the direct supply voltage of the inverter $V_{dC}$, the speed $\omega$ and the reference of the module of the stator current $I_{REF}$, the operation zone is identified in which the machine works. Depending on the operation zone and on the constraints present (voltage limit, stator current limit, rotor current limit), at any instant of motor operation, by using the analytical expressions shown above, it is possible to identify the configuration of the supply $i_{dq}$, $i_e$ that complies with the constraints and produces maximum torque.

In the high-speed operation zone, in which unity power factor operation is set, fine adjustment of the excitation current is carried out so as to improve performance of the system, overcoming any imprecisions in the parameters estimated by the estimator illustrated in SECTION 3.

This fine adjustment consists of adding a corrective value to the value of the excitation current calculated according to the diagram in FIG. 11.

Fine adjustment is based on the principle of reaching the condition in which the vectors representing stator current and stator voltage are in phase or, in an equivalent mode, the vectors representing stator current and stator flux are in quadrature. The latter condition in the rotating two-phase reference system dq is expressed by the following condition $$\Phi_d \cdot i_d + \Phi_q \cdot i_q = 0 \quad (32)$$

The equation (32) represents magnetic stator energy $E_{ms}$. Setting operation at $E_{ms} = 0$ corresponds to not supplying reactive power to the motor by means of the stator currents. $E_{ms} = 0$ operation is obtained by using a proportional-integral regulator (PI) applied to the calculated value $E_{ms}$.

Figure 12:
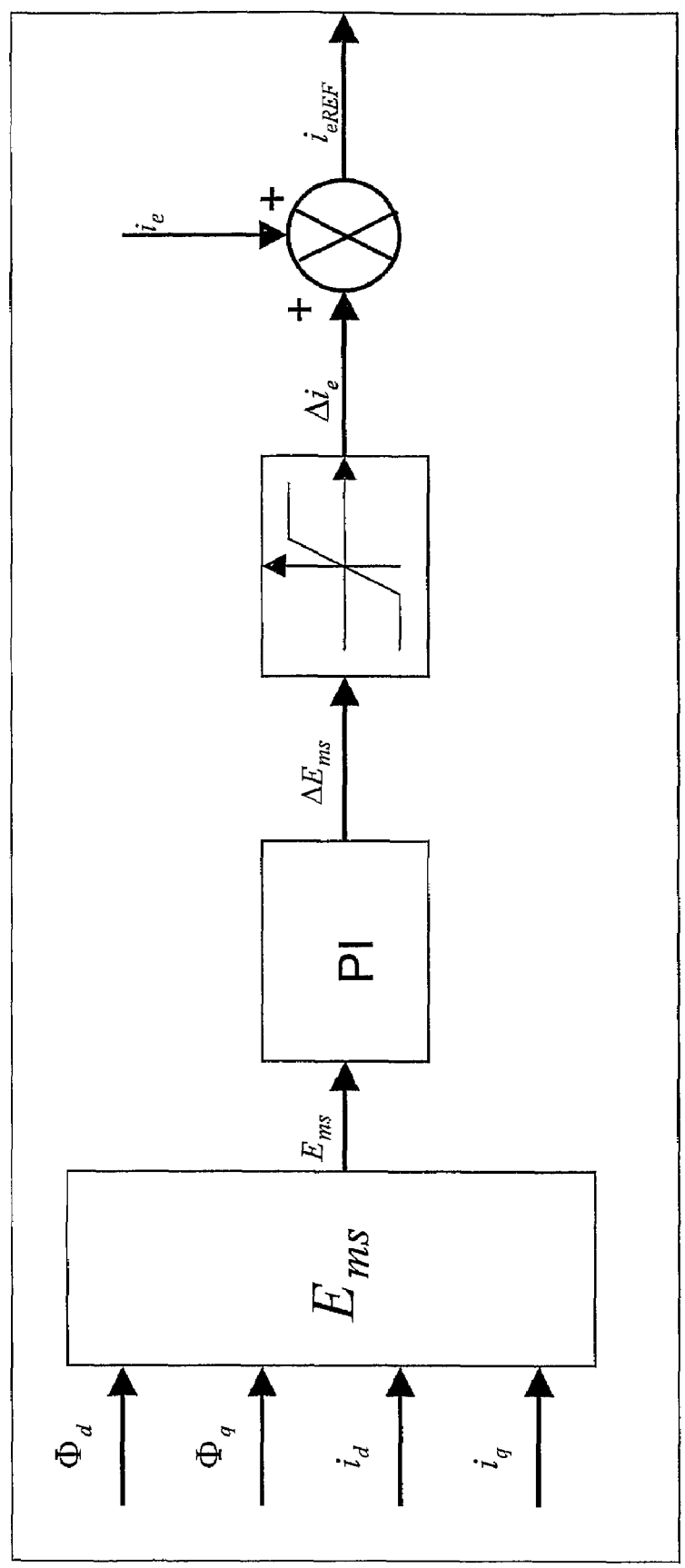
FIG. 12 is a diagram that illustrates a fine adjustment of the excitation current.
Figure 13:
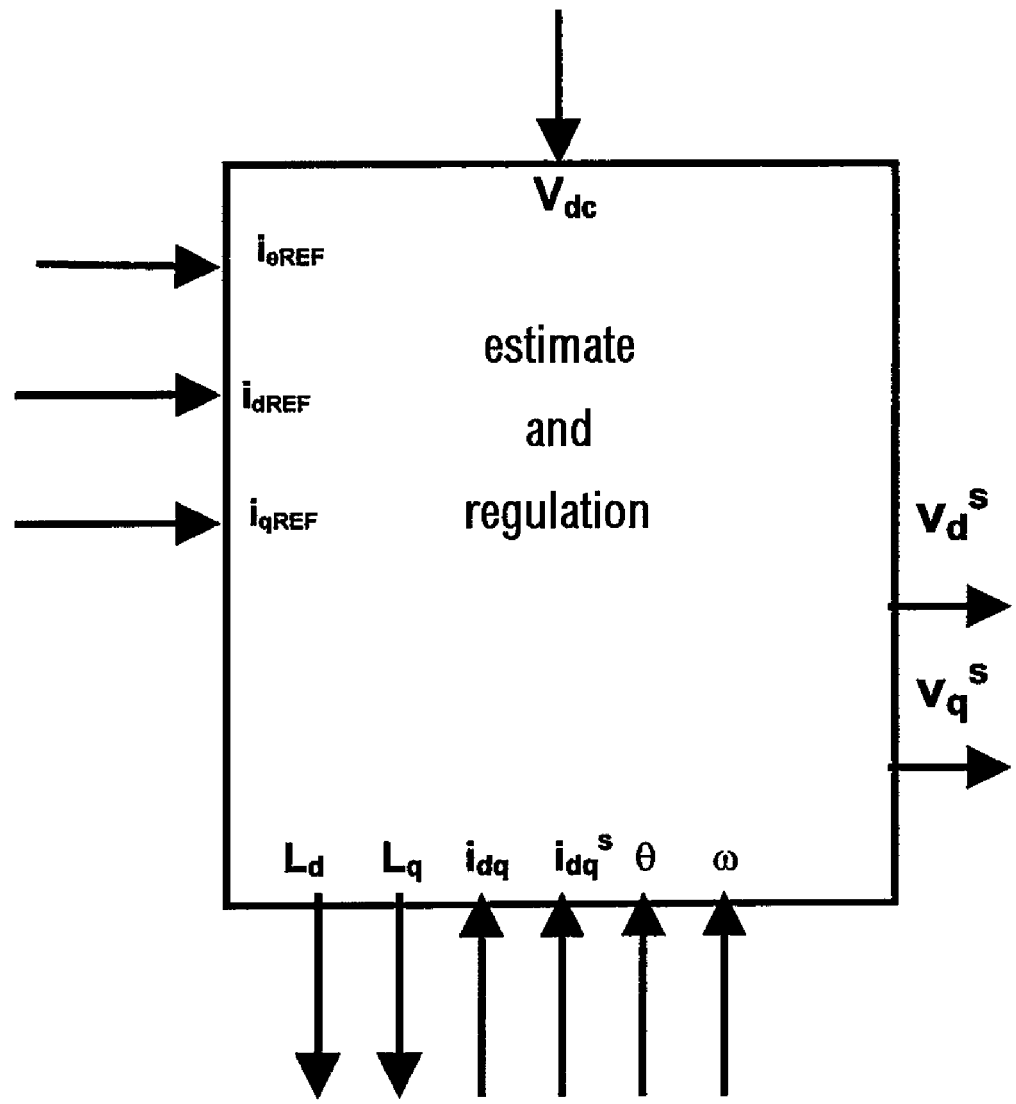
FIG. 13 is a diagram that illustrates the estimate and the regulation of the electromagnetic entities.

The corrective value of the excitation current $i_e$ is added to the result obtained using the calculation system disclosed above and its contribution is limited by a saturator, as shown in FIG. 12.

Section 3—Flux Estimator and Current Regulator

In the ESTIMATOR block of this section the components of the flux-linkage with the stator $\Phi_d$, $\Phi_q$ are estimated. Once the flux is known, the values of the parameters "fictitious inductances" $L_d$, $L_q$ are calculated. These parameters are used in SECTION 2, in the non-linear model of the synchronous machine.

In the ESTIMATOR block the back electromotive force induced in the stator is calculated. This value is used by the regulating block to enable optimal adjustment of the stator current.

In the REGULATOR block the reference value of the voltage that the inverter has to apply to the stator and which enables control of the current at the reference value calculated in SECTION 1 is furthermore calculated.

The operation principle of the flux estimator is illustrated below.

The estimate of flux-linkage with the stator in the two-phase fixed reference system $dq^s$ is based on the following equation:

$$\begin{cases} \Phi_d^s = \int (v_d^s - r_s i_d^s) dt \\ \Phi_q^s = \int (v_q^s - r_s i_q^s) dt \end{cases} \quad (33)$$

or, by deriving $$\begin{cases} \dfrac{d\Phi_d^s}{dt} = v_d^s - r_s i_d^s \\ \dfrac{d\Phi_q^s}{dt} = v_q^s - r_s i_q^s \end{cases} \quad (34)$$

The implementation of the estimator in a digital control system requires (34) to be expressed in discrete form.

$$\begin{cases} \Phi_{d(k+1)}^s = \Delta T(v_{d(k)}^s - r_s \cdot i_{d(k)}^s) + \Phi_{d(k)}^s \\ \Phi_{q(k+1)}^s = \Delta T(v_{q(k)}^s - r_s \cdot i_{q(k)}^s) + \Phi_{q(k)}^s \end{cases} \quad (35)$$

At the k-th cycle a calculation of the flux value at the next cycle (k+1) is made. The flux value resulting from this calculation is then used in the subsequent cycle in terms of fictitious inductances in SECTION 2.

In the equation (35):
the value of the flux at the present instant $\Phi_{dq(k)}^s$ and of the voltage applied in the present instant $V_{dq(k)}^s$ are calculated in the previous instant (k−1) in SECTION 3.
the current $i_{dq(k)}^s$ derives from measurements taken at the present instant.

In order to stabilise the estimate of the fluxes, a term is introduced that represents the value of the "normal operation flux".

This correction is based on the fact that during normal operation the result of the estimator must converge in the value of the "normal operation flux".

The value of the "normal operation flux" $\Phi_{dq\omega}^s$ is calculated in the fixed two-phase reference system as $$\begin{cases} \Phi_{d\omega}^s = -\dfrac{v_q^s - r_s i_q^s}{\omega} \\ \Phi_{q\omega}^s = \dfrac{v_d^s - r_s i_d^s}{\omega} \end{cases} \quad (36)$$

The equation of the estimator (34) must therefore be modified as $$\begin{cases} \dfrac{d\Phi_d^s}{dt} = v_d^s - r_s i_d^s + G(\Phi_{d\omega}^s - \Phi_d^s) \\ \dfrac{d\Phi_q^s}{dt} = v_q^s - r_s i_q^s t + G(\Phi_{q\omega}^s - \Phi_q^s) \end{cases} \quad (37)$$

The parameter G influences the estimator's response. High G values cause a more stable and less precise response. Low G values determine a less stable and more precise response. The discrete equations used for making the flux estimator are $$\begin{cases} \Phi_{d\omega(k)}^s = -\dfrac{v_{q(k)}^s - r_s i_{q(k)}^s}{\omega_{(k)}} \\ \Phi_{q\omega(k)}^s = \dfrac{v_{d(k)}^s - r_s i_{d(k)}^s}{\omega_{(k)}} \end{cases} \quad (38)$$

$$\begin{cases} \Phi_{d(k+1)}^s = \Delta T[v_{d(k)}^s - r_s \cdot i_{d(k)}^s + G(\Phi_{d\omega(k)}^s - \Phi_{d(k)}^s)] + \Phi_{d(k)}^s \\ \Phi_{q(k+1)}^s = \Delta T[v_{q(k)}^s - r_s \cdot i_{q(k)}^s + G(\Phi_{q\omega(k)}^s - \Phi_{q(k)}^s)] + \Phi_{q(k)}^s \end{cases} \quad (39)$$

The estimated fluxes are shown in the rotating two-phase reference system dq by the transformation matrix [T]

$$\begin{bmatrix} \Phi_{d(k+1)} \\ \Phi_{q(k+1)} \end{bmatrix} = [T] \cdot \begin{bmatrix} \Phi_{d(k+1)}^s \\ \Phi_{q(k+1)}^s \end{bmatrix} \quad (40)$$

The values of the "fictitious inductances" corresponding to the estimated fluxes are given by $$\begin{cases} L_{d(k+1)} = \dfrac{\Phi_{d(k+1)}}{N_{d(k)}} \\ L_{q(k+1)} = \dfrac{\Phi_{q(k+1)}}{N_{q(k)}} \end{cases} \quad (41)$$

where $N_{d(k)}$, $N_{q(k)}$ are the equivalent currents of axis d and axis q.

$$\begin{cases} N_{d(k)} = i_{d(k)} + i'_{eREF(k)} \\ N_{q(k)} = i_{q(k)} \end{cases} \quad (42)$$

$i'_{eREF(k)}$ is the reference of the rotor current in relation to the stator.

Figure 14:
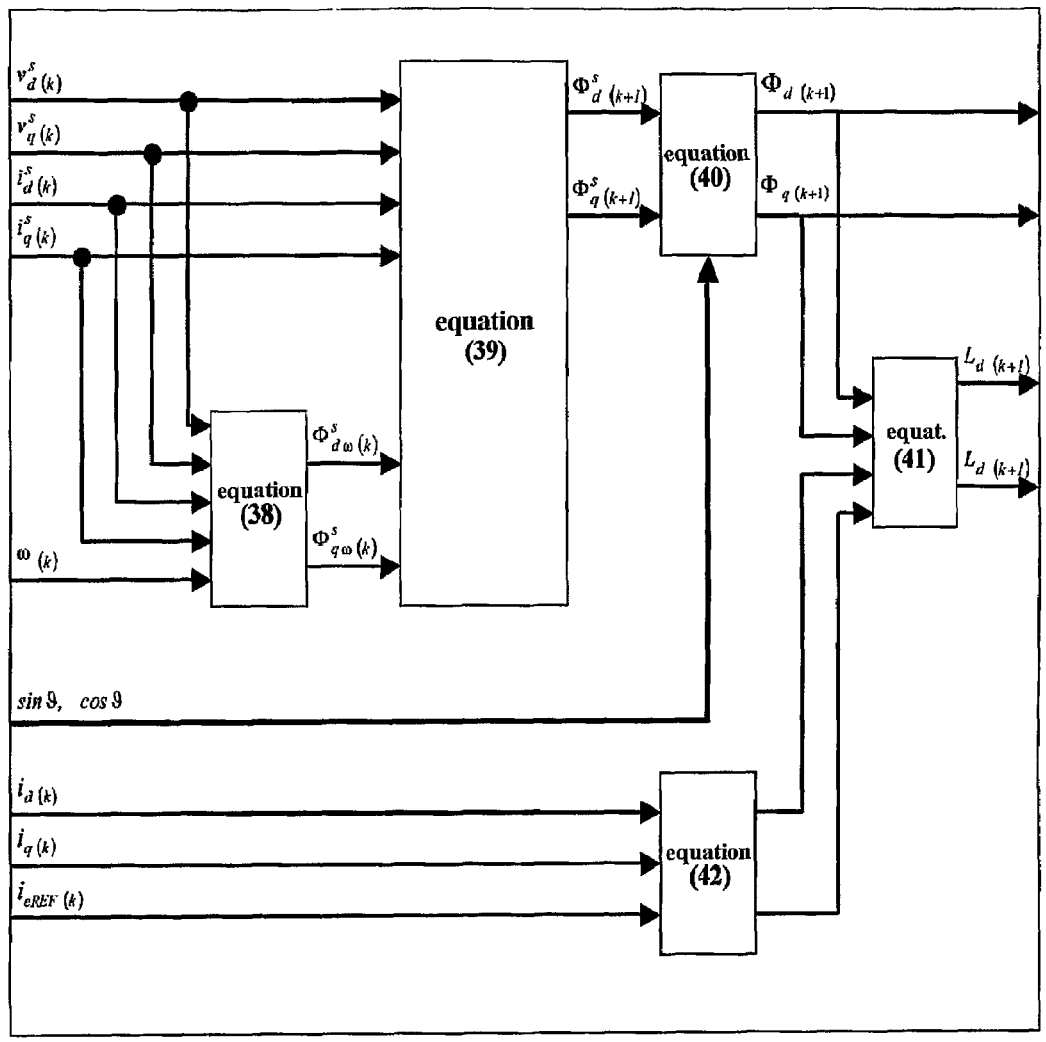
FIG. 14 is a diagram that illustrates the operation of an estimator of the magnetic flux.

The FLUX ESTIMATOR block diagram is shown in FIG. 14.

The invention claimed is:

1. Method for the control of a wound rotor synchronous motor, comprising measuring a plurality of electromagnetic entities indicative of the operation of said motor, generating voltage on a stator of said motor for obtaining a stator current, further generating further voltage on said rotor to obtain a rotor current, before said generating and said further generating, processing said entities to calculate references for said stator current and for said rotor current, said references corresponding to the generation by said motor of the maximum torque obtainable per ampere of stator current supplied, that the method further comprises calculating a value of the rotor current and values of the components of the stator current corresponding to unity power factor operation condition of said motor for an assigned amplitude of the stator current and for a maximum stator voltage value applicable to the motor, comparing said value of the rotor current with a preset maximum rotor current value and, if said value of the rotor current is less than said preset maximum rotor current value, setting a reference of the rotor current equal to said value of the rotor current and setting references of the stator current components equal to said values of the components of the stator current.

2. Method according to claim 1, wherein said unity power factor operation condition occurs when the magnetic stator flux and the stator current are orthogonal to each other.

3. Method according to claim 1, and further comprising, if said value of the rotor current is greater than said maximum preset rotor current value, setting a reference of the rotor current equal to said preset maximum rotor current value.

4. Method according to claim 3, and further comprising calculating further values of the stator current components for which the power factor is maximum for said preset maximum rotor current value and for said assigned amplitude of the stator current and for said maximum stator voltage value applicable to the motor.

5. Method according to claim 4, and further comprising setting references of the stator current components equal to said further values of the stator current components.

6. Method according to claim 1, and further comprising identifying a rotation speed limit value of said rotor below which there is the maximum torque generated by said motor for said preset maximum rotor current value and for said assigned amplitude of the stator current and for said maximum stator voltage value applicable to the motor.

7. Method according to claim 6, and further comprising comparing a measured value of the rotation speed of said rotor with said limit value.

8. Method according to claim 7, wherein said calculating a value of the rotor current and values of the components of the stator current occurs if said value of the rotation speed is greater than said limit value.

9. Method according to claim 8, and further comprising, if said measured value is less than said limit value, setting a reference of the rotor current equal to said preset maximum rotor current value.

10. Method according to claim 9, and further comprising calculating still further values of the stator current components for which torque is maximum for said assigned amplitude of the stator current.

11. Method according to claim 10, and further comprising setting references of the components of said stator current equal to said still further values of the stator current components.

12. Method according to claim 1, and further comprising estimating the features of the magnetic circuit of said motor in relation to the different saturation conditions wherein said motor operates.

13. Method according to claim 12, wherein said estimating comprises defining parameters indicative of said different saturation conditions.

14. Method according to claim 13, wherein said processing comprises using said indicative parameters.

15. Method according to claim 14, wherein said indicative parameters define a link between components of said stator current and corresponding stator flux components.

16. Method according to claim 12, wherein said estimating comprises processing said electromagnetic entities and said references to obtain indications of the stator flux of said motor.

17. Method according to claim 1, wherein said generating is obtained by using an inverter-type converter.

18. Method according to claim 1, wherein said further generating is obtained by means of a chopper.

* * * * *